(12) United States Patent
Owoeye et al.

(10) Patent No.: US 11,834,995 B2
(45) Date of Patent: Dec. 5, 2023

(54) AIR-TO-AIR HEAT EXCHANGER POTENTIAL IN GAS TURBINE ENGINES

(71) Applicant: General Electric Company, Schenectady, NY (US)

(72) Inventors: Eyitayo James Owoeye, Houston, TX (US); Scott Alan Schimmels, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/706,814

(22) Filed: Mar. 29, 2022

(65) Prior Publication Data
US 2023/0313741 A1   Oct. 5, 2023

(51) Int. Cl.
*F02C 7/18* (2006.01)
*F01D 25/12* (2006.01)

(52) U.S. Cl.
CPC ............ *F02C 7/185* (2013.01); *F01D 25/125* (2013.01); *F05D 2260/213* (2013.01); *F05D 2260/2214* (2013.01); *F05D 2260/232* (2013.01); *F05D 2260/606* (2013.01)

(58) Field of Classification Search
CPC ............... F02C 7/185; F05D 2260/213; F05D 2260/2214; F05D 2260/232
See application file for complete search history.

(56) References Cited

U.S. PATENT DOCUMENTS

| 2,999,630 A | 9/1961 | Warren et al. |
|---|---|---|
| 3,341,114 A | 9/1967 | Larson |
| 3,981,466 A | 9/1976 | Shah |

(Continued)

FOREIGN PATENT DOCUMENTS

| CN | 1204005 A | 1/1999 |
|---|---|---|
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Michael L Sehn
(74) *Attorney, Agent, or Firm* — Dority & Manning, P.A.

(57) ABSTRACT

An air-to-air heat exchanger in flow communication with a gas turbine engine is provided. The air-to-air heat exchanger has an air-to-air heat exchanger potential defined by a product raised to a half power, the product being a heat transfer surface area density associated with the air-to-air heat exchanger multiplied by an airflow conductance factor associated with the gas turbine engine. The air-to-air heat exchanger potential is between about 6.7 and 19.5 for a bypass ratio associated with the gas turbine engine between about 3 and 10 and the heat transfer surface area density being between about 3,000 m$^2$/m$^3$ and 10,000 m$^2$/m$^3$ and is between about 2.9 and 12.2 for a bypass ratio associated with the gas turbine engine between about 10 and 20 and the heat transfer surface area density being between about 1,000 m$^2$/m$^3$ and 10,000 m$^2$/m$^3$.

20 Claims, 10 Drawing Sheets

(56) References Cited

U.S. PATENT DOCUMENTS

| | | | |
|---|---|---|---|
| 4,010,608 A | 3/1977 | Simmons |
| 4,043,121 A | 8/1977 | Thomas et al. |
| 4,486,146 A | 12/1984 | Campion |
| 4,542,623 A | 9/1985 | Hovan et al. |
| 4,569,199 A | 2/1986 | Klees et al. |
| 4,607,657 A | 8/1986 | Hirschkron |
| 4,784,575 A | 11/1988 | Nelson et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,345,760 A | 9/1994 | Giffin |
| 5,457,346 A | 10/1995 | Blumberg et al. |
| 5,465,702 A * | 11/1995 | Ferrenberg ............... F02G 3/02 |
| | | | 123/543 |
| 5,950,308 A | 9/1999 | Koff et al. |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 7,536,865 B2 | 5/2009 | Mikhail |
| 7,559,191 B2 | 7/2009 | Parks |
| 7,762,766 B2 | 7/2010 | Shteyman et al. |
| 8,069,912 B2 * | 12/2011 | Campagna ............ F28F 13/003 |
| | | | 165/157 |
| 8,276,392 B2 | 10/2012 | van der Woude |
| 8,382,430 B2 | 2/2013 | Parry et al. |
| 8,397,487 B2 | 3/2013 | Sennoun et al. |
| 8,459,035 B2 | 6/2013 | Smith et al. |
| 8,689,538 B2 | 4/2014 | Sankrithi et al. |
| 8,762,766 B2 | 6/2014 | Ferguson et al. |
| 8,876,465 B2 | 11/2014 | Stretton |
| 8,943,796 B2 | 2/2015 | McCaffrey |
| 8,967,967 B2 | 3/2015 | Stretton et al. |
| 9,027,353 B2 | 5/2015 | Glahn et al. |
| 9,038,398 B2 | 5/2015 | Suciu et al. |
| 9,045,996 B2 | 6/2015 | Anghel et al. |
| 9,096,312 B2 | 8/2015 | Moxon |
| 9,097,134 B2 | 8/2015 | Ferch et al. |
| 9,239,005 B2 | 1/2016 | Strecker et al. |
| 9,534,538 B1 | 1/2017 | Cerny |
| 9,982,555 B2 | 5/2018 | Thet et al. |
| 9,995,314 B2 | 6/2018 | Miller et al. |
| 10,012,146 B2 | 7/2018 | Pelagatti et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,209,009 B2 | 2/2019 | Gerstler et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,415,468 B2 | 9/2019 | Ackermann et al. |
| 10,443,436 B2 | 10/2019 | Miller et al. |
| 10,487,739 B2 | 11/2019 | Miller et al. |
| 10,578,028 B2 | 3/2020 | Becker, Jr. |
| 10,644,630 B2 | 5/2020 | Smith et al. |
| 2004/0197187 A1 | 10/2004 | Usab et al. |
| 2004/0234372 A1 | 11/2004 | Shahpar |
| 2009/0078819 A1 | 3/2009 | Guering et al. |
| 2010/0014977 A1 | 1/2010 | Shattuck |
| 2010/0111674 A1 | 5/2010 | Sparks |
| 2010/0251726 A1 | 10/2010 | Jones et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2013/0104522 A1 | 5/2013 | Kupratis |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2015/0003993 A1 | 1/2015 | Kim et al. |
| 2015/0098813 A1 | 4/2015 | Jarrett, Jr. |
| 2015/0284070 A1 | 10/2015 | Breeze-Stringfellow et al. |
| 2015/0291276 A1 | 10/2015 | Zatorski et al. |
| 2016/0010487 A1 | 1/2016 | Breeze-Stringfellow et al. |
| 2016/0160647 A1 | 6/2016 | Hofer et al. |
| 2016/0202003 A1 | 7/2016 | Gerstler et al. |
| 2016/0230658 A1 | 8/2016 | Hanlon et al. |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0138265 A1 * | 5/2017 | Simon-Delgado ........ F02C 9/18 |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2017/0283073 A1 | 10/2017 | Suciu et al. |
| 2018/0065727 A1 | 3/2018 | Gruber et al. |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0024527 A1 | 1/2019 | Skertic et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0323433 A1 | 10/2019 | Bewick et al. |
| 2019/0360401 A1 | 11/2019 | Rambo et al. |
| 2020/0095939 A1 | 3/2020 | Epstein |
| 2020/0217249 A1 | 7/2020 | Djelassi |
| 2021/0108573 A1 | 4/2021 | Sibbach et al. |

FOREIGN PATENT DOCUMENTS

| | | |
|---|---|---|
| EP | 0385913 A1 | 9/1990 |
| EP | 0887259 A2 | 12/1998 |
| EP | 1493900 A2 | 1/2005 |
| EP | 2540989 A2 | 1/2013 |
| EP | 2562082 A2 | 2/2013 |
| EP | 3054126 A1 | 8/2016 |
| EP | 3093443 A1 | 11/2016 |
| GB | 2100799 A | 1/1983 |
| GB | 2196390 A | 4/1988 |
| GB | 2491811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of 7th International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith JR, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28TH

(56) References Cited

OTHER PUBLICATIONS

Joint Propulsion Conference And Exhibit, Jul. 6-8, 1992, Nashville TN, pp. 1-9.

* cited by examiner

| | |
|---|---|
| AIR-TO-AIR HEAT EXCHANGER POTENTIAL | $AHEP = (HTSAD * ACF)^{1/2}$ |
| HEAT TRANSFER SURFACE AREA DENSITY | $HTSAD = A_{HT}/V_{HT}$ |
| AIRFLOW CONDUCTANCE FACTOR | $ACF = D_{FAN}/(BPR * N_{COMP})$ |
| NUMBER OF COMPRESSOR STAGES | $N_{COMP} = N_{FAN\ STAGES} + N_{AXIAL\ STAGES} + N_{CENTRIFUGAL\ STAGES}$ |

FIG. 5

| TURBOFAN ENGINES | EXAMPLE 1 | EXAMPLE 2 | EXAMPLE 3 | EXAMPLE 4 |
|---|---|---|---|---|
| HTSAD (m2/m3) | 1000 | 1500 | 3000 | 10000 |
| FAN DIAMETER (m) | 0.7 | 2.1 | 3.0 | 3.5 |
| BYPASS RATIO (-) | 3 | 12 | 10 | 20 |
| NUMBER OF COMPRESSOR STAGES (-) | 4 | 8 | 15 | 20 |
| AIR-TO-AIR EXCHANGER POTENTIAL (-) | 7.64 | 5.67 | 7.74 | 9.35 |

AIR-TO-AIR HEAT EXCHANGER POTENTIAL IN GAS TURBINE ENGINES

FIELD

The present disclosure relates to air-to-air heat exchangers for gas turbine engines.

BACKGROUND

A gas turbine engine can include one or more heat exchangers, such as one or more air-to-air heat exchangers. Such air-to-air heat exchangers can be configured to cool relatively warm high pressure air using relatively cool low pressure air. The cooled high pressure air can be used to cool certain components, such as bearings and turbine components. A gas turbine engine having an air-to-air heat exchanger that is arranged to be compact and capable of receiving air flow to be effective in processing heat duty would be a useful addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 lists various relationships between heat exchanger characteristics and operational and architectural characteristics of a gas turbine engine in accordance with example embodiments of the present disclosure.

DETAILED DESCRIPTION

Figure 1:
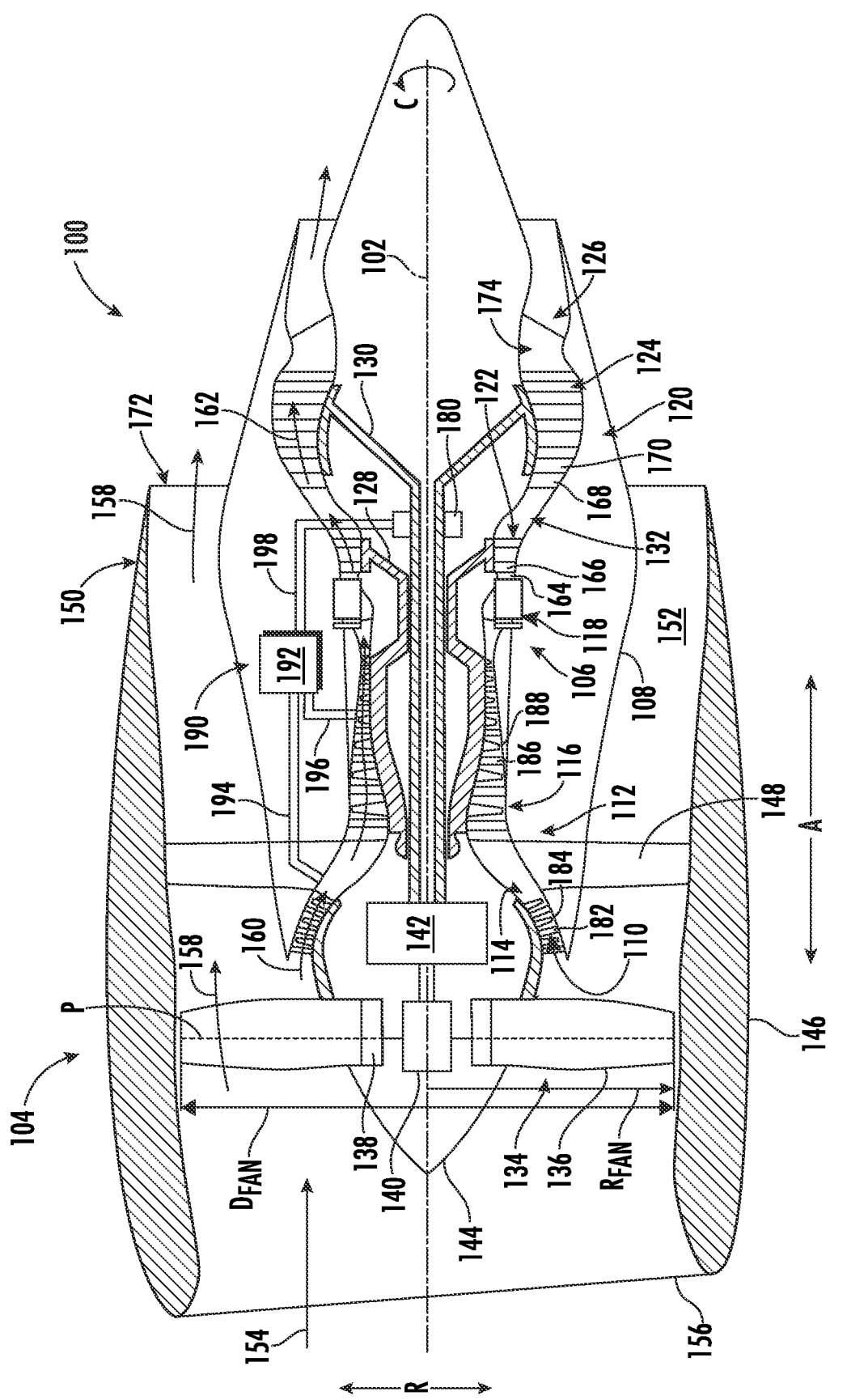
FIG. 1 provides a schematic cross-sectional view of a gas turbine engine in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

(a) Definitions

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

(b) Problem Statement

Some gas turbine engines can include one or more heat exchangers. For instance, a gas turbine engine can include an air-to-air heat exchanger configured to cool relatively warm high pressure air using relatively cool low pressure air. The cooled high pressure air can be used to cool certain components, such as bearings or turbine components of the gas turbine engine. Designing a gas turbine engine having an air-to-air heat exchanger that is both compact and able to effectively process heat duty has been challenging.

The inventors of the present disclosure have developed architectures for a gas turbine engine having an air-to-air heat exchanger that is both compact and able to effectively process heat duty. Particularly, the inventors proceeded in the manner of designing a turbofan engine with given fan, compressor, and bypass ratio characteristics, as well as characteristics of an air-to-air heat exchanger in flow communication with a core of the engine; checking the compactness and efficiency of the air-to-air heat exchanger given the characteristics of the fan, compressor, and bypass ratio as well as characteristics of the heat exchanger; redesigning the engine and/or heat exchanger by varying the fan diameter, number of compressor stages, and bypass ratio characteristics as well as the area and/or volume of the channels of the heat exchanger; rechecking the compactness and efficiency of the air-to-air heat exchanger given the characteristics of the fan, compressor, and bypass ratio as well as characteristics of the heat exchanger; etc. during the design of several different types of gas turbine engines, including the gas turbine engine described below with reference to FIG. 1.

During the course of this practice of studying/evaluating various fan, compressor, bypass ratio, and heat exchanger characteristics considered feasible for best satisfying mission requirements, a relationship was unexpectedly discovered between the compactness of the heat exchanger and the ease of airflow supply to the heat exchanger. This relationship is represented by an air-to-air heat exchanger potential. The air-to-air heat exchanger potential can be thought of as an indicator of the compactness and effectiveness of a heat exchanger to process heat duty given the architectural arrangement of the gas turbine engine and the architectural arrangement of the air-to-air heat exchanger. The inventors have found that a gas turbine engine having an air-to-air heat exchanger that has an air-to-air heat exchanger potential within a range specified herein renders a heat exchanger that is both compact and effective at processing heat duty.

(c) Detailed Description of Primary Embodiments

Referring now to the drawings, FIG. 1 provides a schematic cross-sectional view of a gas turbine engine 100 according to an example embodiment of the present disclosure. For the depicted embodiment of FIG. 1, the gas turbine engine 100 is an aeronautical, high-bypass turbofan jet engine configured to be mounted to an aircraft, e.g., in an under-wing configuration. As shown, the gas turbine engine 100 defines an axial direction A, a radial direction R, and a circumferential direction C. The axial direction A extends parallel to or coaxial with a longitudinal centerline 102 defined by the gas turbine engine 100.

The gas turbine engine 100 includes a fan section 104 and an engine core 106 disposed downstream of the fan section 104. The engine core 106 includes an engine cowl 108 that defines an annular core inlet 110. The engine cowl 108 encases, in a serial flow relationship, a compressor section 112 including a first, booster or LP compressor 114 and a second, HP compressor 116; a combustion section 118; a turbine section 120 including a first, HP turbine 122 and a second, LP turbine 124; and an exhaust section 126. An HP shaft 128 drivingly connects the HP turbine 122 to the HP compressor 116. An LP shaft 130 drivingly connects the LP turbine 124 to the LP compressor 114. The compressor section 112, combustion section 118, turbine section 120, and exhaust section 126 together define a core air flowpath 132 through the engine core 106.

The fan section 104 includes a fan 134 having a plurality of fan blades 136 coupled to a disk 138 in a circumferentially-spaced apart manner. As depicted, the fan blades 136 extend outward from the disk 138 generally along the radial direction R. For this embodiment, each fan blade 136 is rotatable relative to the disk 138 about a pitch axis P by virtue of the fan blades 136 being mechanically coupled to a suitable actuation member 140 configured to collectively vary the pitch of the fan blades 136, e.g., in unison. The fan blades 136, disk 138, and actuation member 140 are together rotatable about the longitudinal centerline 102 by the LP shaft 130 across a power gearbox 142. The power gearbox 142 includes a plurality of gears for stepping down the rotational speed of the LP shaft 130 to provide a more efficient rotational fan speed. In other embodiments, the fan blades 136, disk 138, and actuation member 140 can be directly connected to the LP shaft 130, e.g., in a direct-drive configuration. Further, in other embodiments, the fan blades 136 of the fan 134 can be fixed-pitch fan blades.

Referring still to FIG. 1, the disk 138 is covered by a rotatable spinner 144 aerodynamically contoured to promote an airflow through the plurality of fan blades 136. Additionally, the fan section 104 includes an annular fan casing or outer nacelle 146 that circumferentially surrounds the fan 134 and/or at least a portion of the engine core 106. The nacelle 146 is supported relative to the engine core 106 by a plurality of circumferentially-spaced outlet guide vanes 148. A downstream section 150 of the nacelle 146 extends over an outer portion of the engine core 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of air 158 is directed or routed into the bypass airflow passage 152 and a second portion of air 160 is directed or routed into the core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor stator vanes 186 and HP compressor blades 188 that progressively compress the second portion of air 160 even further. The HP compressor blades 188 are mechanically coupled to the HP shaft 128. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates, thereby supporting operation of the LP compressor 114 and the fan 134.

The combustion gases 162 are subsequently routed through the exhaust section 126 of the engine core 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the exhaust section 126 at least partially define the hot gas path 174 for routing the combustion gases 162 through the engine core 106.

As further shown in FIG. 1, the gas turbine engine 100 includes a cooling system 190 for cooling various components, such as a bearing 180. The cooling system 190 includes one or more heat exchangers, such as heat exchanger 192. The heat exchanger 192 can be a Buffer Air Heat Exchanger (BAHE), for example. For this embodiment, the heat exchanger 192 is configured to receive low pressure compressor discharge bleed air to cool air bled from the HP compressor 116 before the cooled HP compressor air is delivered to cool the bearing 180 and optionally other components as well. The low pressure compressor discharge bleed air can be bled from the core air flowpath 132 and routed to the heat exchanger 192 via a first delivery conduit 194. Bleed air from the HP compressor 116 can be routed to the heat exchanger 192 via a second delivery conduit 196. After being cooled by the Station 2.5 bleed air at the heat exchanger 192, the cooled bleed air from the HP compressor 116 can be routed to the bearing 180 via a third delivery conduit 198. Although not shown, the Station 2.5 bleed air can be routed from the heat exchanger 192 to any suitable location, such as to a core compartment, back to the core air flowpath 132, to another heat exchanger, or to another suitable location.

It will be appreciated that the gas turbine engine 100 depicted in FIG. 1 is provided by way of example only, and that in other example embodiments, the gas turbine engine 100 may have any other suitable configuration. Additionally, or alternatively, aspects of the present disclosure may be utilized with other suitable aeronautical gas turbine engine, such as a turboshaft engine, turboprop engine, turbojet engine, etc.

Figure 2:
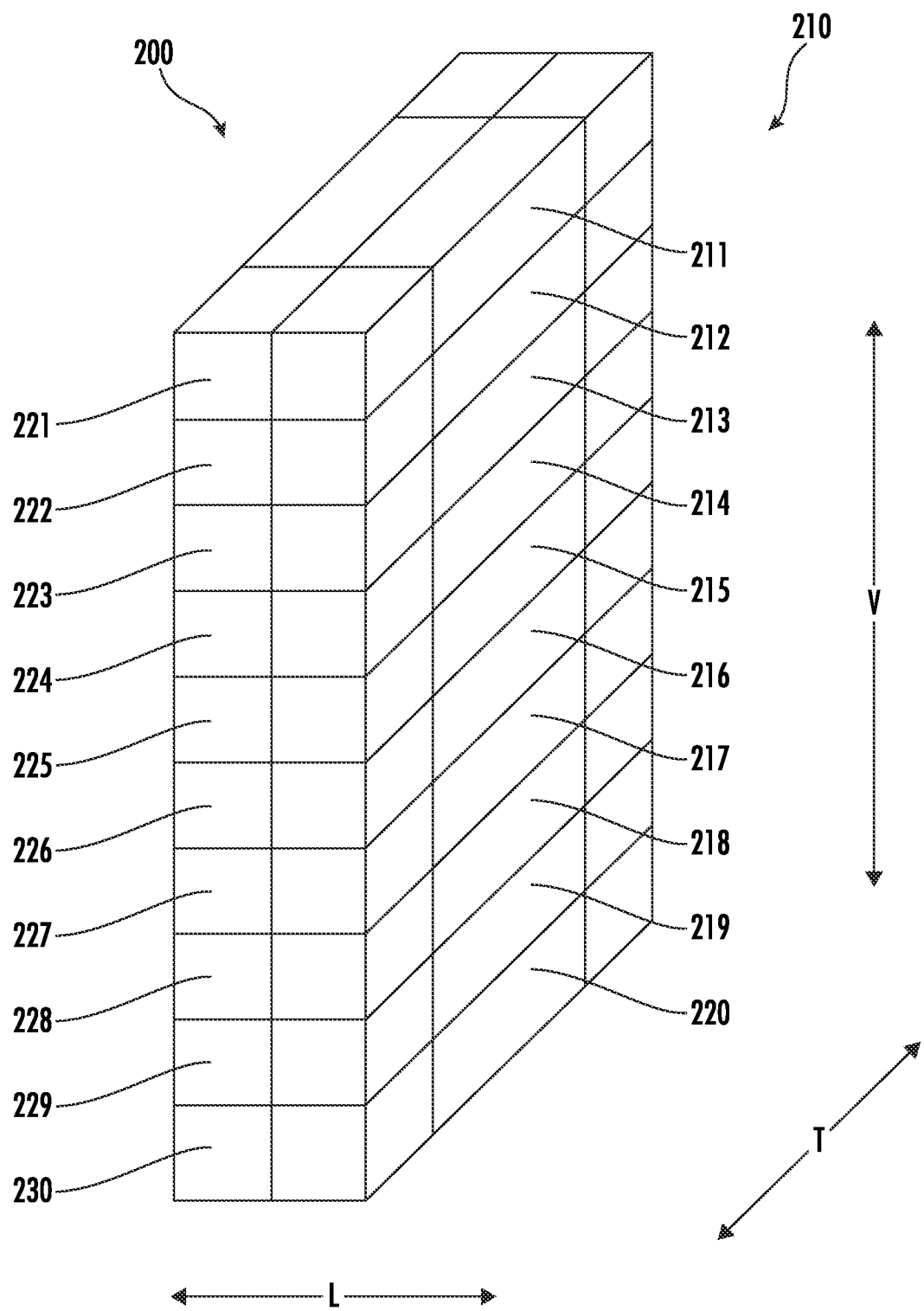
FIG. 2 provides a perspective view of a heat exchanger in accordance with an example embodiment of the present disclosure.

FIG. 2 provides a perspective view of a heat exchanger 200 in accordance with an example embodiment of the present disclosure. The heat exchanger 200 can be implemented as the BAHE provided in FIG. 1, for example. As depicted, the heat exchanger 200 defines a vertical direction V, a lateral direction L, and a transverse direction T that are orthogonal to one another. The heat exchanger 200 includes a plurality of exchanger units 210. The exchanger units 210 can be compactly arranged in any suitable configuration. For this embodiment, the heat exchanger 200 includes twenty (20) exchanger units 210, including ten right-side exchanger units 211-220 stacked on top of one another along the vertical direction V and ten left-side exchanger units 221-230 stacked on top of one another along the vertical direction V. Although the heat exchanger 200 of FIG. 2 has twenty exchanger units 210, in other example embodiments, the heat exchanger 200 can include any suitable number of exchanger units, such as one exchanger unit, eight exchanger units, fifty exchanger units, etc. Further, in other embodiments, the exchanger units 210 can be positioned side-by-side rather than stacked on one another.

Figure 4:
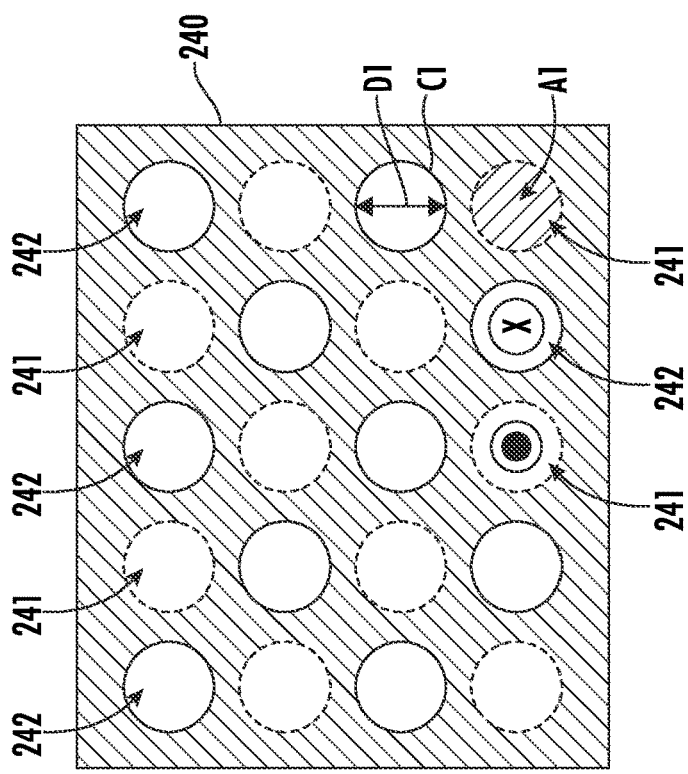
FIG. 4 provides a cross-sectional view of a core of the exchanger unit taken along line 4-4 of FIG. 3.
Figure 3:
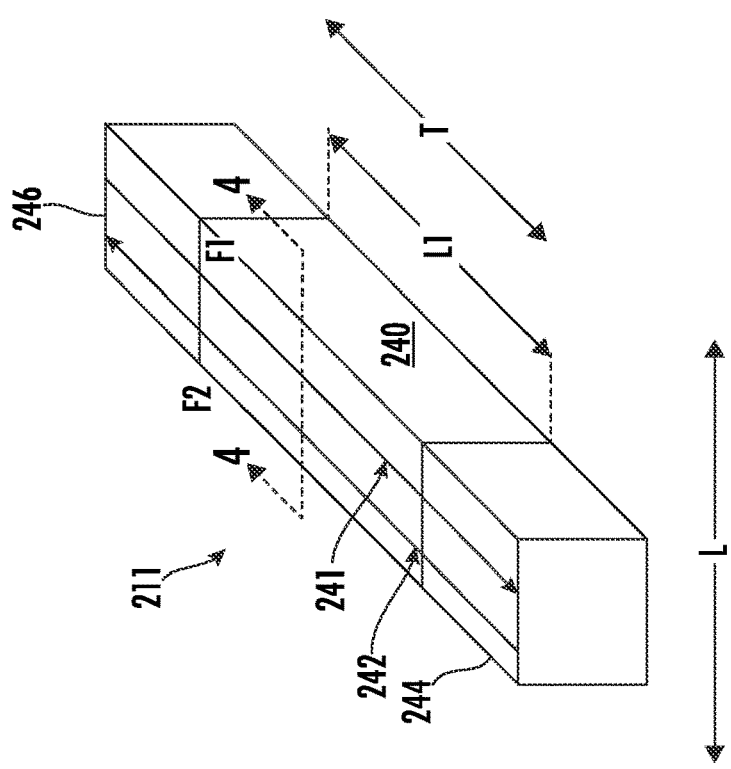
FIG. 3 provides a perspective view of an exchanger unit of the heat exchanger of FIG. 2.

With reference now to FIGS. 2, 3, and 4, FIG. 3 provides a perspective view of a first exchanger unit 211 of the heat exchanger 200 of FIG. 2. FIG. 4 provides a cross-sectional view of a core of the first exchanger unit 211 taken along line 4-4 of FIG. 3. Generally, each exchanger unit 210 of the heat exchanger 200 has a core and two manifolds. The core of each exchanger unit 210 defines first channels and second channels. The first channels can receive a first fluid and the second channels can receive a second fluid. The core of one or more of the exchanger units 210 can be formed by a plurality of unit cells arranged in flow communication with one another. Alternatively, the core of one or more of the exchanger units 210 can be formed as a monolithic block.

By way of example, as depicted, the first exchanger unit 211 includes a core 240 defining first channels 241 (outlined by dashed lines in FIG. 4) and second channels 242 (outlined by solid lines in FIG. 4). The first channels 241 can receive a first fluid F1 and the second channels 242 can receive a second fluid F2. The first fluid F1 and the second fluid F2 can both be air, for example. In this regard, the heat exchanger 200 can be an air-to-air heat exchanger. The first fluid F1 flowing through the first channels 241 can be both warmer and at a higher pressure than the second fluid F2 flowing through the second channels 242, or vice versa. In this way, thermal energy can be exchanged between the first and second fluids F1, F2 as they flow through the first exchanger unit 211. For this embodiment, the first fluid F1 flowing through the first channels 241 (out of the page as represented by the "circled dot" in FIG. 4) is in counterflow direction with respect to the second fluid F2 flowing through the second channels 242 (into the page as represented by the "circled X" in FIG. 4).

Although the core 240 of the first exchanger unit 211 is shown in a straight channel configuration in FIG. 3, the core 240 of the first exchanger unit 211 (as well as the cores of the other exchanger units 210) can have other suitable configurations, such as a double U-bend channel configuration, a single U-bend configuration, etc.

The first exchanger unit 211 includes a first manifold 244 and a second manifold 246. Generally, the first manifold 244 distributes the second fluid F2 to the second channels 242 and receives the first fluid F1 from the first channels 241. The first manifold 244 can be arranged to keep the first fluid F1 and the second fluid F2 fluidly separate. Similarly, the second manifold 246 distributes the first fluid F1 to the first channels 241 and receives the second fluid F2 from the second channels 242. The second manifold 246 can be arranged to keep the first fluid F1 and the second fluid F2 fluidly separate. The first manifold 244 and/or second manifold 246 can be in flow communication with a manifold of an adjacent exchanger unit such that the first and/or second fluids F1, F2 can flow between exchanger units 210 of the heat exchanger 200.

Each exchanger unit 210 of the heat exchanger 200 can be configured in a same or similar manner as the first exchanger unit 211 provided above. In this way, each exchanger unit 210 of the heat exchanger 200 can have a core arranged in a same or similar manner as the core 240 of the first exchanger unit 211 and two manifolds arranged in a same or similar manner as the first and second manifolds 244, 246 of the first exchanger unit 211. The core of each exchanger unit 210 defines first channels and second channels just as the core 240 defines the defines the first channels 241 and the second channels 242.

(d) Parametric Discussion; P-Claim Elements

As alluded to earlier, the inventors discovered, unexpectedly during the course of engine design, that a relationship exists between the compactness of a heat exchanger and the ease of airflow supply to the heat exchanger. This relationship is represented by an air-to-air heat exchanger potential. The inventors have found that an air-to-air heat exchanger having an air-to-air heat exchanger potential within one of the ranges specified herein provides a heat exchanger that is both compact and effective at processing heat duty.

The air-to-air heat exchanger potential is a dimensionless quantity that relates a heat exchanger's heat transfer surface area density and an airflow conductance factor of the gas turbine engine. The heat transfer surface area density provides a measure of the compactness of the heat exchanger and is a function of the heat transfer surface area and volume of the channels of the heat exchanger. The airflow conductance factor provides a measure of the ease of airflow through the engine core into the heat exchanger and is a function of a fan diameter of a fan of the gas turbine engine, a bypass ratio of the gas turbine engine, and a number of compressor stages. In this way, the airflow conductance factor is based on the architecture of the gas turbine engine.

As engine designers continue to increase bypass ratios of engines, ease of airflow supply to a heat exchanger in flow communication with the engine core exponentially decreases, as does the air-to-air heat exchanger potential value. This indicates that heat exchangers with high heat transfer surface area density values may be useful in processing the heat duty in high bypass turbofan engines. Generally, the combination of higher heat transfer surface area density and airflow conductance factor leads to higher potential for the heat exchanger to process more heat duty. A heat exchanger in flow communication with a gas turbine engine having an air-to-air heat exchanger potential within a range specified herein may facilitate achieving the heat duty in high bypass turbofan engines whilst taking into account certain considerations.

Particularly, the ranges of air-to-air heat exchanger potentials for air-to-air heat exchangers noted herein capture specific subsets of structures for air-to-air heat exchangers and gas turbines that take into consideration various benefits and penalties of choosing one structural architecture of a heat exchanger and/or gas turbine engine over another. In this regard, as discovered by the inventors, the ranges of air-to-air heat exchanger potentials for air-to-air heat exchangers provided herein strike a balance between the ease of supplying air flow to a heat exchanger, the compactness and weight of the heat exchanger, the ability of the heat exchanger to process heat duty, the susceptibility of the channels of the heat exchanger to becoming blocked or contaminated, the manufacturability of the heat exchanger, the manufacturability of the gas turbine engine, the thrust output of the gas turbine engine, and the bleed flow penalty on the gas turbine engine. Accordingly, a heat exchanger having an air-to-air heat exchanger potential within a range specified herein can ensure that the architecture of the heat exchanger and the architecture of the gas turbine engine are such that the heat exchanger is optimally compact and effective at processing heat duty.

Further, utilizing the air-to-air heat exchanger potential value, the inventors found that the number of suitable or feasible engine and/or heat exchanger designs that allow the heat exchanger to meet compactness, weight, and heat duty requirements could be greatly diminished, thereby facilitating a more rapid down selection of designs to consider as a gas turbine engine having an air-to-air heat exchanger is developed. Such a benefit provides more insight into the requirements for a given gas turbine engine well before specific technologies, integration and system requirements are developed fully. It may also prevent late-stage redesign. For instance, selection of a heat exchanger's heat transfer surface area density may be facilitated by utilizing the air-to-air heat exchanger potential value, which may help determine the needed channel diameters and wall thickness of the core of the heat exchanger. Moreover, utilizing the air-to-air heat exchanger potential may eliminate or otherwise reduce implementation of heat exchangers having heat transfer surface area density values that are too high, making them not practical to manufacture. Higher heat transfer surface area density values may create higher susceptibility to blocking/contamination of the exchanger channels, which may limit the heat exchanger's effectiveness. Also, utilizing an air-to-air heat exchanger potential within the ranges provided herein may facilitate exclusion or reduction of heat exchangers that are bulky.

With reference now to FIGS. 1, 2, 3, 4, and 5, FIG. 5 lists various relationships between heat exchanger characteristics and operational and architectural characteristics of a gas turbine engine. Notably, the gas turbine engine 100 and the heat exchanger 200 in flow communication with the gas turbine engine 100 are arranged so that the heat exchanger 200 has an air-to-air heat exchanger potential AHEP. The air-to-air heat exchanger potential AHEP is a dimensionless quantity that relates a heat transfer surface area density HTSAD of the heat exchanger 200 and an airflow conductance factor ACF of the gas turbine engine 100. As will be explained more fully below, the heat transfer surface area density HTSAD is a function of the structural architecture of the heat exchanger 200 and the airflow conductance factor ACF is a function of the structural architecture of the gas turbine engine 100.

The air-to-air heat exchanger potential AHEP is defined as a product raised to a half power, wherein the product is the heat transfer surface area density HTSAD associated with the air-to-air heat exchanger 200 multiplied by the airflow conductance factor ACF associated with the gas turbine engine 100. In this regard, the air-to-air heat exchanger potential AHEP relates the heat transfer surface area density HTSAD of the heat exchanger 200 and the airflow conductance factor ACF of the gas turbine engine 100. The air-to-air heat exchanger potential AHEP is defined by the inventors as follows:

$$AHEP = (HTSAD*ACF)^{1/2} \qquad (1)$$

The heat transfer surface area density HTSAD provides a measure of the compactness of the heat exchanger 200. The heat transfer surface area density HTSAD is defined as a quotient determined by dividing a heat exchanger channel surface area $A_{HT}$ associated with a plurality of channels 241, 242 of the heat exchanger 200 by a heat exchanger channel volume $V_{HT}$ associated with the plurality of channels 241, 242. Stated differently, the heat exchanger channel surface area $A_{HT}$ divided by the heat exchanger channel volume $V_{HT}$ is equal to the heat transfer surface area density HTSAD. The heat exchanger channel surface area $A_{HT}$ is defined by a surface area of the channels 241, 242 of the heat exchanger 200. The heat exchanger channel volume $V_{HT}$ is defined by a volume of the channels 241, 242 of the heat exchanger 200. In this regard, the heat transfer surface area density HTSAD relates the surface area of the channels 241, 242 with the volume of the channels 241, 242. The unit of measure for the heat transfer surface area density HTSAD is meters squared per meters cubed ($m^2/m^3$). The heat transfer surface area density HTSAD is defined by the inventors as follows:

$$HTSAD = A_{HT}/V_{HT} \qquad (2)$$

The heat exchanger channel surface area $A_{HT}$ may be determined as follows. First, the surface area associated with each channel of each core of the heat exchanger 200 is determined. The surface area for a given one of the channels may be defined as a circumference C1 (see FIG. 4 depicting a circumference of one of the second channels 242) of the given channel multiplied by a length L1 (FIG. 3) of the given channel. As will be appreciated, the circumference C1 of the given channel may be defined as the diameter D1 multiplied by Pi ($\pi$). Second, once the surface area associated with each channel 241, 242 of the core 240 of each exchanger unit 210 of the heat exchanger 200 is determined, the surface area for each channel 241, 242 is summed to determine the heat exchanger channel surface area $A_{HT}$. In this regard, the heat exchanger channel surface area $A_{HT}$ describes the total surface area associated with the channels 241, 242 of the core 240 of each exchanger unit 210 of the heat exchanger 200.

The heat exchanger channel volume $V_{HT}$ may be determined as follows. First, the volume associated with each channel of the core of each exchanger unit 210 is determined. The volume for a given one of the channels may be defined as an area A1 of the given channel (represented in FIG. 4 by the cross hatching in one of the first channels 241) multiplied by the length L1 of the given channel. As will be appreciated, the area A1 of the given channel may be defined as the diameter D1 squared multiplied by Pi ($\pi$) multiplied by one quarter, or stated differently, the radius of the given channel squared multiplied by Pi ($\pi$). Second, once the volume associated with each channel of the core of each exchanger unit 210 of the heat exchanger 200 is determined, the volume for each channel is summed to determine the heat exchanger channel volume $V_{HT}$. In this regard, the heat exchanger channel volume $V_{HT}$ describes the total volume associated with the channels 241, 242 of the core 240 of each exchanger unit 210 of the heat exchanger 200.

The airflow conductance factor ACF associated with the gas turbine engine 100 provides a measure of the ease of airflow across a gas turbine engine 100. The airflow conductance factor ACF is defined as a quotient determined by dividing a fan diameter $D_{FAN}$ by a product, the product being defined by a bypass ratio BPR of the gas turbine engine 100 multiplied by a number of compressor stages $N_{COMP}$ of the gas turbine engine 100. Stated another way, the fan diameter $D_{FAN}$ divided by a product of the bypass ratio BPR and the number of compressor stages $N_{COMP}$ is equal to the airflow conductance factor ACF. The unit of measure for the airflow conductance factor ACF is meters (m). The airflow conductance factor ACF is defined by the inventors as follows:

$$ACF=D_{FAN}/(BPR*N_{COMP}) \quad (3)$$

The fan diameter $D_{FAN}$ is defined as a distance spanning between a leading edge tip of one fan blade 136 to a leading edge tip of a radially opposite fan blade 136. Stated another way, the fan diameter $D_{FAN}$ is defined as a fan radius $R_{FAN}$ multiplied by two, or stated mathematically, as $D_{FAN}=R_{FAN}*2$, wherein the fan radius $R_{FAN}$ spans from the longitudinal centerline 102 to a leading edge tip of one of the fan blades 136. The unit of measure for the fan diameter $D_{FAN}$ is meters (m). In some example embodiments, the fan diameter $D_{FAN}$ of the fan 134 of the gas turbine engine 100 is between about 0.7 m and 3.5 m. In other example embodiments, the fan diameter $D_{FAN}$ of the fan 134 of the gas turbine engine 100 is between about 1.8 m and 3.5 m. In instances in which the fan section 104 includes a plurality of fan stages, the fan diameter $D_{FAN}$ is to be determined based on the fan having the largest fan diameter.

The bypass ratio BPR of the gas turbine engine 100 is defined by a ratio of a mass flow rate of the first portion of air 158 flowing through the bypass passage 152 to a mass flow rate of the second portion of air 160 entering the engine core 106 through the core inlet 110. In some example embodiments, the bypass ratio BPR of the gas turbine engine 100 may be between about three and twenty (3-20). In other example embodiments, the bypass ratio BPR of the gas turbine engine 100 may be between about three and ten (3-10). In further example embodiments, the bypass ratio BPR of the gas turbine engine 100 may be between about ten and twenty (10-20).

The number of compressor stages $N_{COMP}$ of the gas turbine engine 100 is defined as the number of stages of the compressor section, which can include one or more compressors, and the number of stages of the fan section, which can include one or more fans. The one or more compressors of the compressor section can include one or more axial stages and one or more centrifugal stages (e.g., one or more impellers). The fan section can include one or more fan stages, including one or more primary fans, mid fans, etc. The fans can be ducted or non-ducted fans. As used herein, a "stage" is defined as an array of airfoils that are mechanically coupled with a shaft of a gas turbine engine and rotatable about a longitudinal centerline of the gas turbine engine.

The number of compressor stages $N_{COMP}$ is defined according to (4), wherein $N_{COMP}$ is the number of compressor stages $N_{COMP}$, $N_{Fan\ stages}$ is the number of fan stages of the fan section, $N_{Axial\ Stages}$ is the number of axial stages of the compressor section, and $N_{Centrifugal\ Stages}$ is the number of centrifugal stages of the compressor section:

$$N_{COMP}=N_{Fan\ Stages}+N_{Axial\ Stages}+N_{Centrifugal\ Stages} \quad (4)$$

By way of example, the number of compressor stages $N_{COMP}$ of the gas turbine engine 100 of FIG. 1 is eleven (11). The fan section 104 includes the fan 134, which is a single stage fan. The fan 134 includes an array of airfoils, which are the fan blades 136, that are rotatable about the longitudinal centerline 102. The fan blades 136 are mechanically coupled with the LP shaft 130. Thus, the fan section 104 includes one (1) stage. The LP compressor 114 of the compressor section 112 includes three (3) axial stages. As shown, the LP compressor 114 includes three axially-spaced arrays of rotating airfoils that are mechanically coupled with the LP shaft 130. The rotating airfoils of the LP compressor 114 are labeled in FIG. 1 as the LP compressor blades 184. The HP compressor 116 of the compressor section 112 includes seven (7) axial stages. As depicted, the HP compressor 116 includes seven axially-spaced arrays of rotating airfoils that are mechanically coupled with the HP shaft 128. The rotating airfoils of the HP compressor 116 are labeled in FIG. 1 as the HP compressor blades 188. Accordingly, for this example, the number of compressor stages $N_{COMP}$ of the gas turbine engine 100 of FIG. 1 adds to eleven (11), with the fan section 104 including one (1) stage and the compressor section 112 including ten (10) stages. In some embodiments, the number of compressor stages $N_{COMP}$ of the gas turbine engine is between 4 and 20. In some embodiments, the number of compressor stages $N_{COMP}$ of the gas turbine engine is between 10 and 20.

Figure 6:
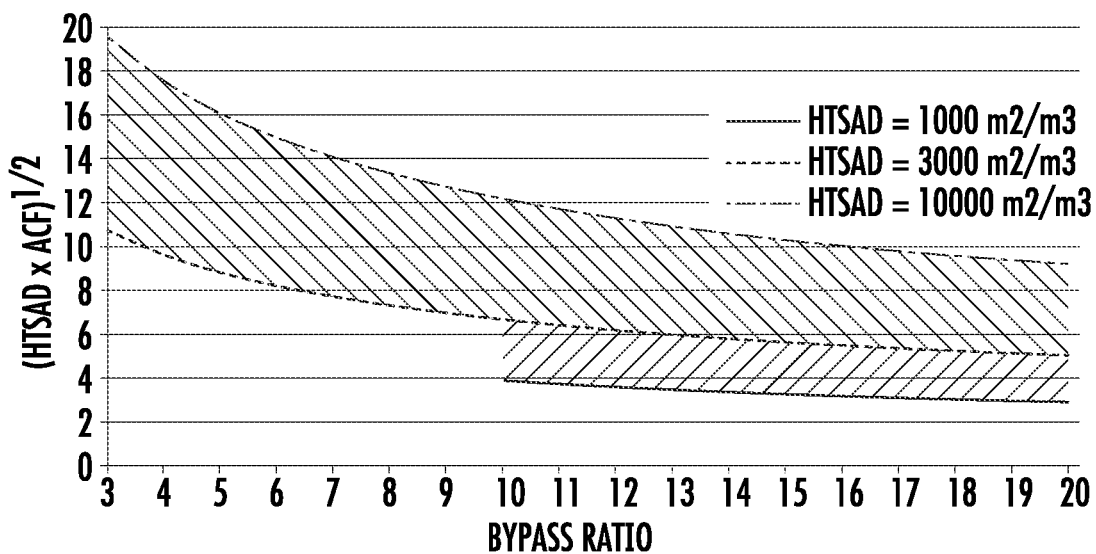
FIGS. 6 through 14 each graphically depict an air-to-air heat exchanger potential of an air-to-air heat exchanger coupled in flow communication with a gas turbine engine as a function of a bypass ratio of the gas turbine engine in accordance with example embodiments of the present disclosure.

In some embodiments, the air-to-air heat exchanger 200 has an air-to-air heat exchanger potential AHEP between about 6.7 and 19.5 for a bypass ratio BPR associated with the gas turbine engine 100 between about 3 and 10 and the heat transfer surface area density HTSAD being between about 3,000 m$^2$/m$^3$ and 10,000 m$^2$/m$^3$ and between about 2.9 and 12.2 for a bypass ratio BPR associated with the gas turbine engine 100 between about 10 and 20 and the heat transfer surface area density HTSAD being between about 1,000 m$^2$/m$^3$ and 10,000 m$^2$/m$^3$. FIG. 6 graphically depicts the air-to-air heat exchanger potential AHEP as a function of bypass ratio BPR for such example embodiments.

Figure 7:
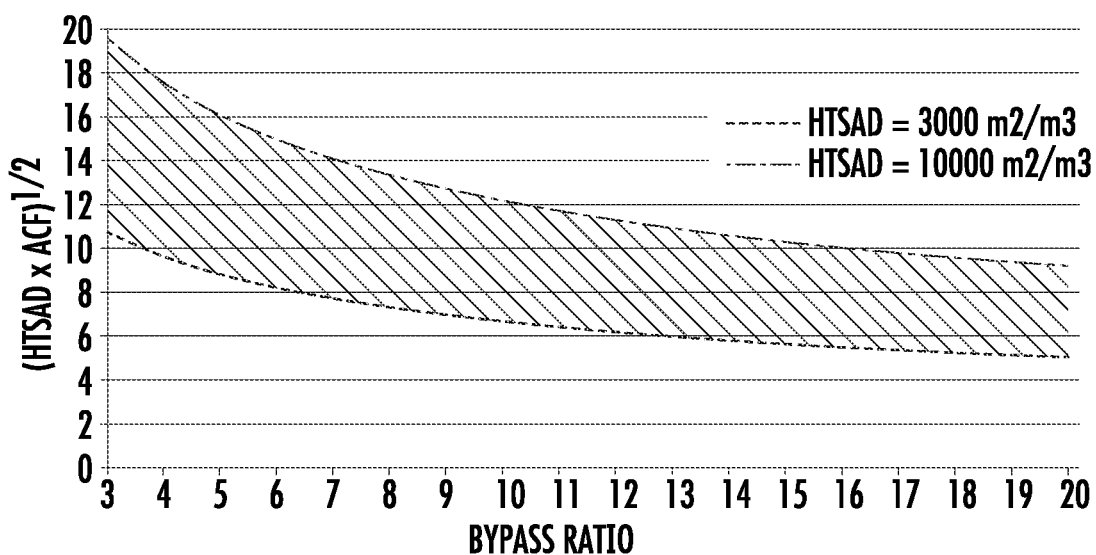

In yet other embodiments, the air-to-air heat exchanger 200 has an air-to-air heat exchanger potential AHEP between about 5.1 and 19.5 for a bypass ratio BPR associated with the gas turbine engine 100 between about 3 and 20 and the heat transfer surface area density HTSAD being between about 3,000 m$^2$/m$^3$ and 10,000 m$^2$/m$^3$. FIG. 7 graphically depicts the air-to-air heat exchanger potential AHEP as a function of bypass ratio BPR for such example embodiments.

Figure 8:
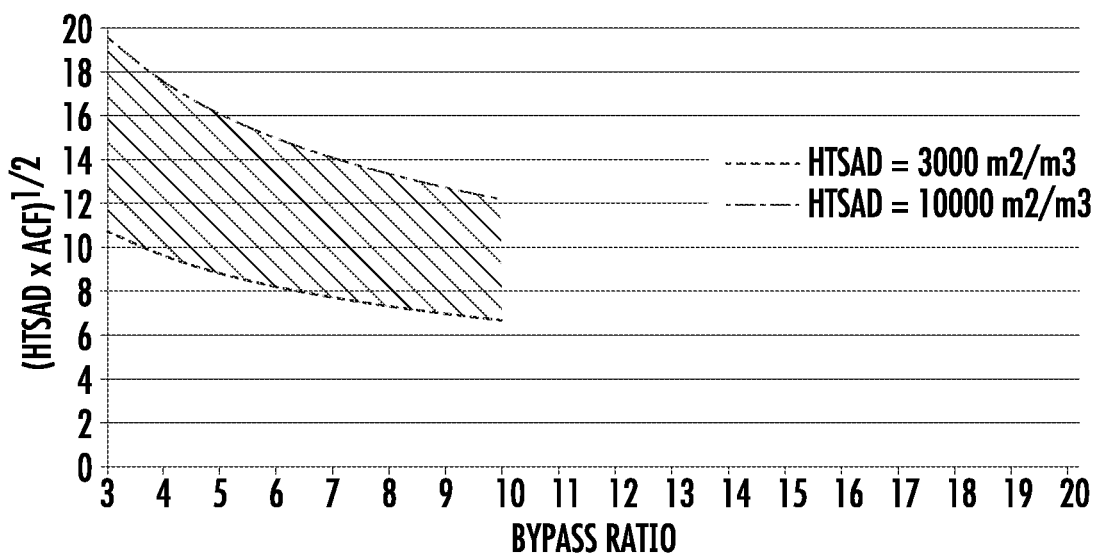

In other embodiments, the air-to-air heat exchanger 200 has an air-to-air heat exchanger potential AHEP between about 6.7 and 19.5 for a bypass ratio BPR associated with the gas turbine engine 100 between about 3 and 10 and the heat transfer surface area density HTSAD being between about 3,000 m²/m³ and 10,000 m²/m³. FIG. 8 graphically depicts the air-to-air heat exchanger potential AHEP as a function of bypass ratio BPR for such example embodiments.

Figure 9:
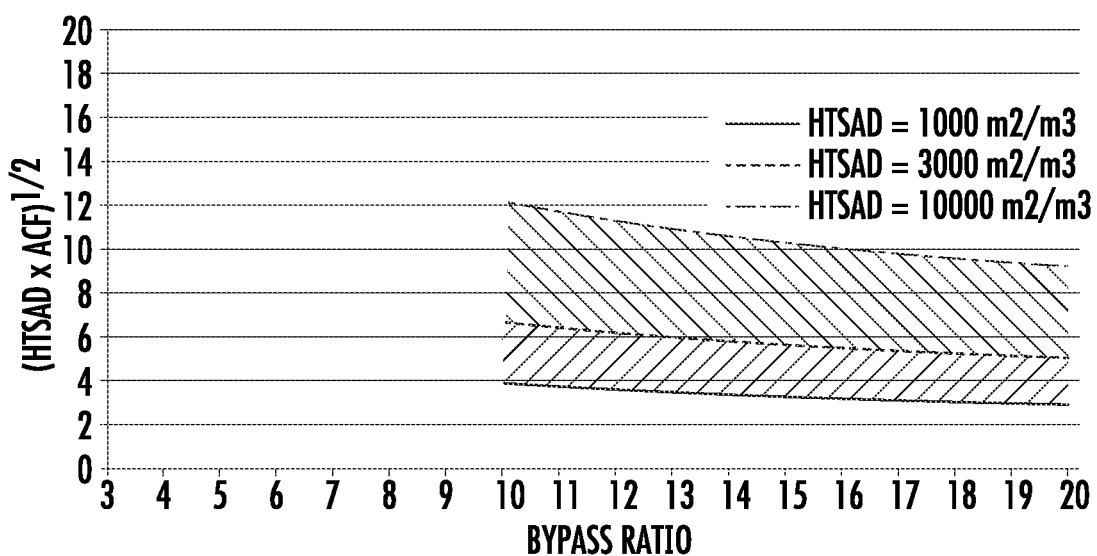

In some further embodiments, the air-to-air heat exchanger 200 has an air-to-air heat exchanger potential AHEP between about 2.9 and 12.2 for a bypass ratio BPR associated with the gas turbine engine 100 between about 10 and 20 and the heat transfer surface area density HTSAD being between about 1,000 m²/m³ and 10,000 m²/m³. FIG. 9 graphically depicts the air-to-air heat exchanger potential AHEP as a function of bypass ratio BPR for such example embodiments.

Figure 10:
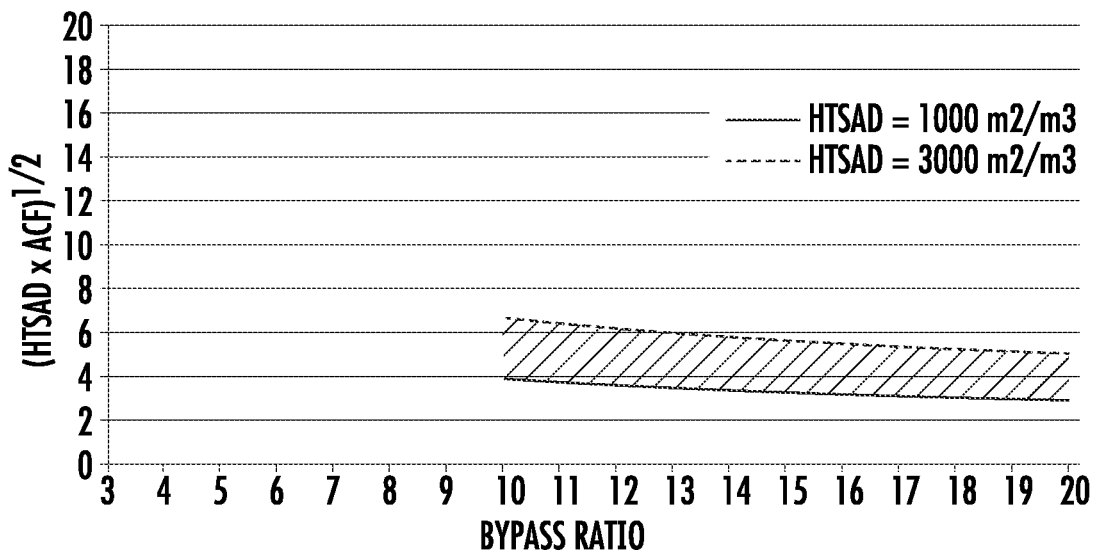

In yet other embodiments, the air-to-air heat exchanger 200 has an air-to-air heat exchanger potential AHEP between about 2.9 and 6.7 for a bypass ratio BPR associated with the gas turbine engine between about 10 and 20 and the heat transfer surface area density HTSAD being between about 1,000 m²/m³ and 3,000 m²/m³. FIG. 10 graphically depicts the air-to-air heat exchanger potential AHEP as a function of bypass ratio BPR for such example embodiments.

Figure 11:
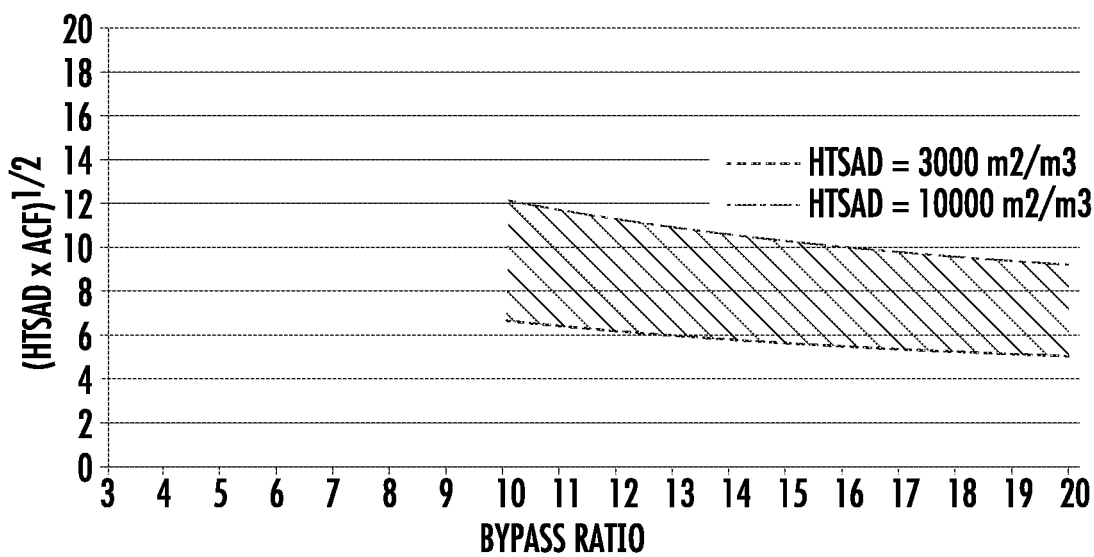

In further embodiments, the air-to-air heat exchanger 200 has an air-to-air heat exchanger potential AHEP between about 5.1 and 12.2 for a bypass ratio BPR associated with the gas turbine engine between about 10 and 20 and the heat transfer surface area density HTSAD being between about 3,000 m²/m³ and 10,000 m²/m³. FIG. 11 graphically depicts the air-to-air heat exchanger potential AHEP as a function of bypass ratio BPR for such example embodiments.

Figure 12:
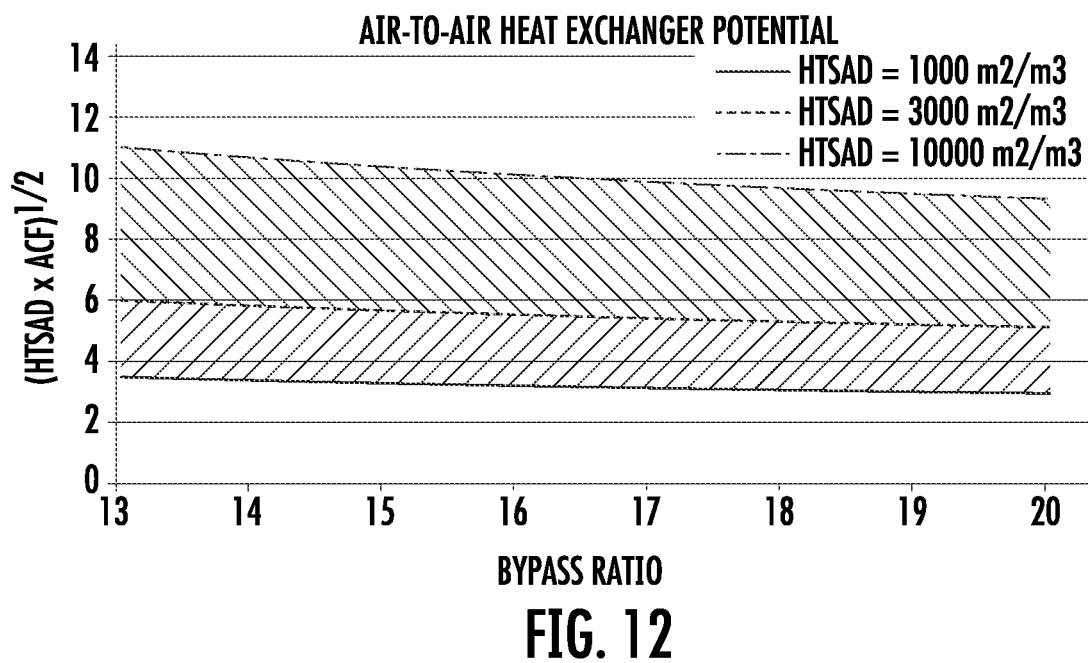

In some further embodiments, the air-to-air heat exchanger 200 has an air-to-air heat exchanger potential AHEP between about 2.9 and 11 for a bypass ratio BPR associated with the gas turbine engine 100 between about 13 and 20 and the heat transfer surface area density HTSAD being between about 1,000 m²/m³ and 10,000 m²/m³. FIG. 12 graphically depicts the air-to-air heat exchanger potential AHEP as a function of bypass ratio BPR for such example embodiments.

Figure 13:
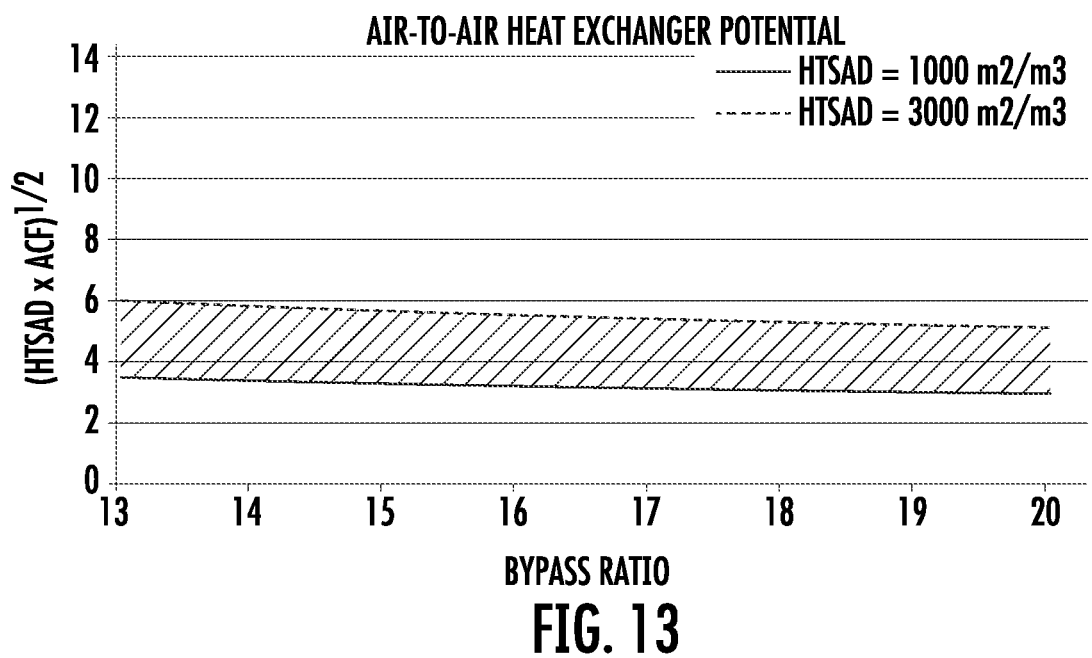

In further embodiments, the air-to-air heat exchanger 200 has an air-to-air heat exchanger potential AHEP between about 2.9 and 6.1 for a bypass ratio BPR associated with the gas turbine engine between about 13 and 20 and the heat transfer surface area density HTSAD being between about 1,000 m²/m³ and 3,000 m²/m³. FIG. 13 graphically depicts the air-to-air heat exchanger potential AHEP as a function of bypass ratio BPR for such example embodiments.

Figures 14, 15:
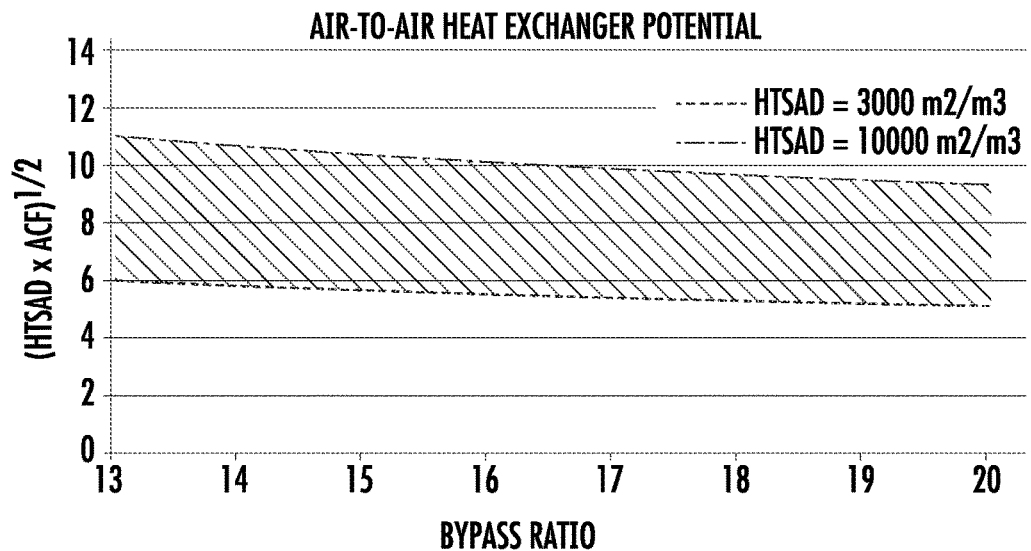
FIG. 15 provides a table listing values for four different example gas turbine engines in accordance with example embodiments of the present disclosure.

Further, in some embodiments, the air-to-air heat exchanger 200 has an air-to-air heat exchanger potential AHEP between about 5.1 and 11 for a bypass ratio BPR associated with the gas turbine engine between about 13 and 20 and the heat transfer surface area density HTSAD being between about 3,000 m²/m³ and 10,000 m²/m³. FIG. 14 graphically depicts the air-to-air heat exchanger potential AHEP as a function of bypass ratio BPR for such example embodiments.

With reference now to FIG. 15, various examples of gas turbine engines each having an air-to-air heat exchanger in flow communication therewith are provided below.

EXAMPLE 1: In a first example, a gas turbine engine includes an air-to-air heat exchanger. The air-to-air heat exchanger is arranged such that the heat transfer surface area density HTSAD is 1,000 m²/m³. The gas turbine engine has a fan having a fan diameter $D_{FAN}$ of 0.7 m. The gas turbine engine defines a bypass ratio BPR of 3.0. The gas turbine engine is further arranged such that the gas turbine engine has four (4) compressor stages. Accordingly, the number of compressor stages $N_{COMP}$ is four (4). For the first example, the air-to-air heat exchanger potential AHEP is 7.64.

EXAMPLE 2: In a second example, a gas turbine engine includes an air-to-air heat exchanger. The air-to-air heat exchanger is arranged such that the heat transfer surface area density HTSAD is 1,500 m²/m³. The gas turbine engine has a fan having a fan diameter $D_{FAN}$ of 2.1 m. The gas turbine engine defines a bypass ratio BPR of 12.0. The gas turbine engine is further arranged such that the gas turbine engine has eight (8) compressor stages. Accordingly, the number of compressor stages $N_{COMP}$ is eight (8). For the second example, the air-to-air heat exchanger potential AHEP is 5.67.

EXAMPLE 3: In a third example, a gas turbine engine includes an air-to-air heat exchanger. The air-to-air heat exchanger is arranged such that the heat transfer surface area density HTSAD is 3,000 m²/m³. The gas turbine engine has a fan having a fan diameter $D_{FAN}$ of 3.0 m. The gas turbine engine defines a bypass ratio BPR of 10.0. The gas turbine engine is further arranged such that the gas turbine engine has fifteen (15) compressor stages. Accordingly, the number of compressor stages $N_{COMP}$ is fifteen (15). For the third example, the air-to-air heat exchanger potential AHEP is 7.74.

EXAMPLE 4: In a fourth example, a gas turbine engine includes an air-to-air heat exchanger. The air-to-air heat exchanger is arranged such that the heat transfer surface area density HTSAD is 10,000 m²/m³. The gas turbine engine has a fan having a fan diameter $D_{FAN}$ of 3.5 m. The gas turbine engine defines a bypass ratio BPR of 20.0. The gas turbine engine is further arranged such that the gas turbine engine has twenty (20) compressor stages. Accordingly, the number of compressor stages $N_{COMP}$ is twenty (20). For the fourth example, the air-to-air heat exchanger potential AHEP is 9.35.

Figure 16:
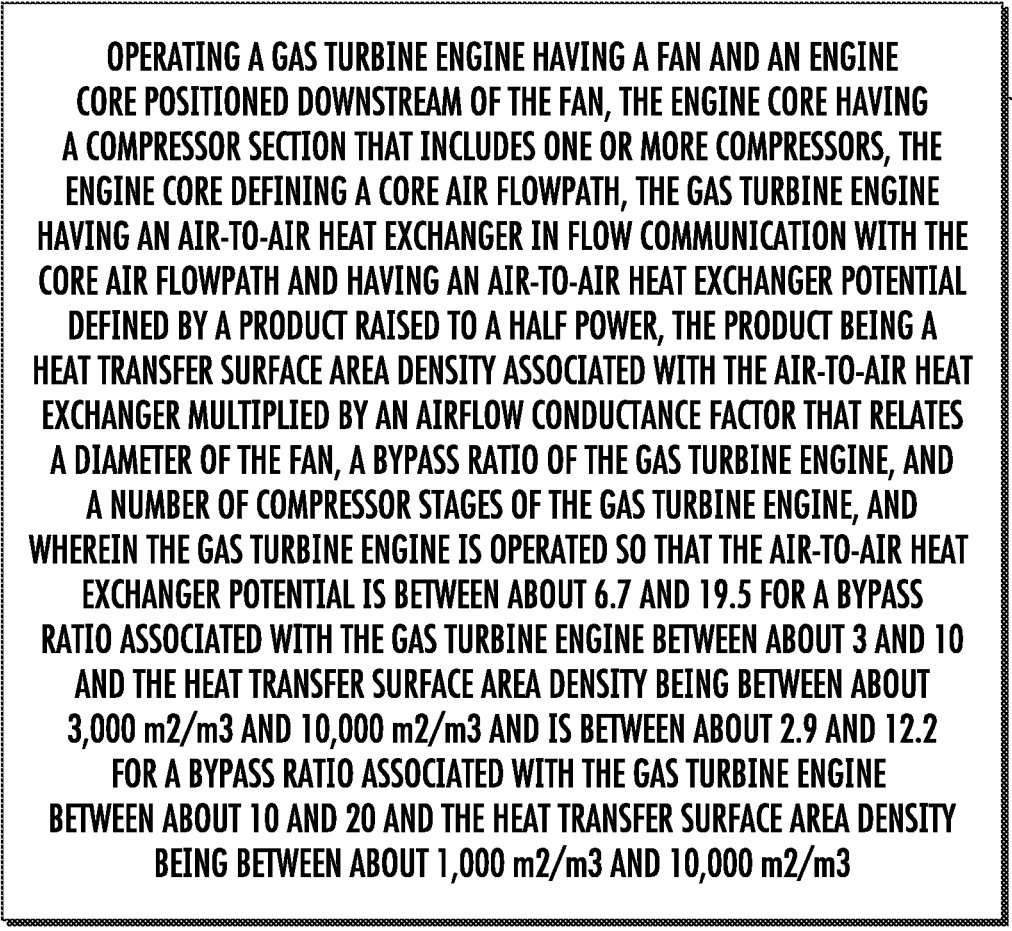
FIG. 16 provides a flow diagram for a method of operating a gas turbine engine having a heat exchanger in flow communication thereto in accordance with an example embodiment of the present disclosure.

FIG. 16 provides a flow diagram for a method 300 of operating a gas turbine engine having a heat exchanger in flow communication thereto.

At 302, the method includes operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a heat transfer surface area density associated with the air-to-air heat exchanger multiplied by an airflow conductance factor that relates a diameter of the fan, a bypass ratio of the gas turbine engine, and a number of compressor stages of the gas turbine engine, and wherein the gas turbine engine is operated so that the air-to-air heat exchanger potential is between about 6.7 and 19.5 for a bypass ratio associated with the gas turbine engine between about 3 and 10 and the heat transfer surface area density being between about 3,000 m²/m³ and 10,000 m²/m³ and is between about 2.9 and 12.2 for a bypass ratio associated with the gas turbine engine between about 10 and 20 and the heat transfer surface area density being between about 1,000 m²/m³ and 10,000 m²/m³.

In some implementations, the air-to-air heat exchanger includes one or more exchanger units each having a core defining a plurality of channels. For instance, the air-to-air heat exchanger can include twenty exchanger units as depicted in FIG. 2. In such implementations, the heat transfer surface area density is defined as a quotient determined by dividing a heat exchanger channel surface area associated with the plurality of channels of the one or more exchanger units to a heat exchanger channel volume associated with the plurality of channels of the one or more exchanger units. In this way, the heat transfer surface area density is a function of the heat transfer surface area and volume of the channels of the heat exchanger.

In some implementations, the airflow conductance factor associated with the gas turbine engine is defined as a quotient determined by dividing a fan diameter of a fan of the gas turbine engine by a product, the product being defined by a bypass ratio of the gas turbine engine multiplied by a number of compressor stages of the gas turbine engine. In this way, the airflow conductance factor is a function of a fan diameter of a fan of the gas turbine engine, a bypass ratio of the gas turbine engine, and a number of compressor stages. In some further implementations, the diameter of the fan of the gas turbine engine is between about 0.7 m and 3.5 m. In other implementations, the diameter of the fan of the gas turbine engine is between about 1.8 m and 3.5 m. In some other implementations, the number of compressor stages of the gas turbine engine is between 4 and 20.

In some implementations, the gas turbine engine is operated so that the air-to-air heat exchanger potential is between about 5.1 and 19.5 for a bypass ratio associated with the gas turbine engine between about 3 and 20 and the heat transfer surface area density being between about 3,000 $m^2/m^3$ and 10,000 $m^2/m^3$. The air-to-air heat exchanger potential according to such implementations is graphically represented in FIG. 7.

In some implementations, the gas turbine engine is operated so that the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$. The air-to-air heat exchanger potential according to such implementations is graphically represented in FIG. 8.

In some implementations, the gas turbine engine is operated so that the air-to-air heat exchanger potential is between about 2.9 and 12.2 for a bypass ratio associated with the gas turbine engine between about 10 and 20 and the heat transfer surface area density being between about 1,000 $m^2/m^3$ and 10,000 $m^2/m^3$. The air-to-air heat exchanger potential according to such implementations is graphically represented in FIG. 9.

In some implementations, the gas turbine engine is operated so that the air-to-air heat exchanger potential is between about 2.9 and 6.7 for a bypass ratio associated with the gas turbine engine between about 10 and 20 and the heat transfer surface area density being between about 1,000 $m^2/m^3$ and 3,000 $m^2/m^3$. The air-to-air heat exchanger potential according to such implementations is graphically represented in FIG. 10.

In some implementations, the gas turbine engine is operated so that the air-to-air heat exchanger potential is between about 5.1 and 12.2 for a bypass ratio associated with the gas turbine engine between about 10 and 20 and the heat transfer surface area density being between about 3,000 $m^2/m^3$ and 10,000 $m^2/m^3$. The air-to-air heat exchanger potential according to such implementations is graphically represented in FIG. 11.

In some implementations, the gas turbine engine is operated so that the air-to-air heat exchanger potential is between about 2.9 and 11 for a bypass ratio associated with the gas turbine engine between about 13 and 20 and the heat transfer surface area density being between about 1,000 $m^2/m^3$ and 10,000 $m^2/m^3$. The air-to-air heat exchanger potential according to such implementations is graphically represented in FIG. 12.

In some implementations, the gas turbine engine is operated so that the air-to-air heat exchanger potential is between about 2.9 and 6.1 for a bypass ratio associated with the gas turbine engine between about 13 and 20 and the heat transfer surface area density being between about 1,000 $m^2/m^3$ and 3,000 $m^2/m^3$. The air-to-air heat exchanger potential according to such implementations is graphically represented in FIG. 13.

In some implementations, the gas turbine engine is operated so that the air-to-air heat exchanger potential is between about 5.1 and 11 for a bypass ratio associated with the gas turbine engine between about 13 and 20 and the heat transfer surface area density being between about 3,000 $m^2/m^3$ and 10,000 $m^2/m^3$. The air-to-air heat exchanger potential according to such implementations is graphically represented in FIG. 14.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

(e) Clauses

Further aspects are provided by the subject matter of the following clauses:

A gas turbine engine, comprising: a compressor section, a combustion section, and a turbine section in a serial flow arrangement; and an air-to-air heat exchanger having an air-to-air heat exchanger potential defined by a product raised to a half power, the product being a heat transfer surface area density associated with the air-to-air heat exchanger multiplied by an airflow conductance factor associated with the gas turbine engine, and wherein the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$ and is between about 2.9 and 12.2 for a bypass ratio associated with the gas turbine engine between about 10 and 20 and the heat transfer surface area density being between about 1,000 $m^2/m^3$ and 10,000 $m^2/m^3$.

The gas turbine engine of any preceding clause, wherein the compressor section, the combustion section, and the turbine section are disposed along a core air flowpath of the gas turbine engine, and wherein the air-to-air heat exchanger is in flow communication with the core air flowpath.

The gas turbine engine of any preceding clause, wherein the compressor section, the combustion section, and the turbine section are disposed along a core air flowpath of the gas turbine engine, and wherein the air-to-air heat exchanger is in flow communication with the core air flowpath at the compressor section.

The gas turbine engine of any preceding clause, wherein the air-to-air heat exchanger further comprises one or more exchanger units each having a core defining a plurality of channels.

The gas turbine engine of any preceding clause, wherein the heat transfer surface area density is defined as a quotient determined by dividing a heat exchanger channel surface area associated with the plurality of channels of the one or more exchanger units to a heat exchanger channel volume associated with the plurality of channels of the one or more exchanger units.

The gas turbine engine of any preceding clause, further comprising: a fan, and wherein the airflow conductance factor associated with the gas turbine engine is defined as a quotient determined by dividing a fan diameter of the fan of the gas turbine engine by a product, the product being defined by a bypass ratio of the gas turbine engine multiplied by a number of compressor stages of the gas turbine engine.

The gas turbine engine of any preceding clause, wherein the fan diameter is between about 0.7 m and 3.5 m.

The gas turbine engine of any preceding clause, wherein the fan diameter is between about 1.8 m and 3.5 m.

The gas turbine engine of any preceding clause, wherein the number of compressor stages of the gas turbine engine is between 4 and 20.

The gas turbine engine of any preceding clause, wherein the air-to-air heat exchanger potential is between about 5.1 and 19.5 for a bypass ratio associated with the gas turbine engine between about 3 and 20 and the heat transfer surface area density being between about 3,000 $m^2/m^3$ and 10,000 $m^2/m^3$.

The gas turbine engine of any preceding clause, wherein the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$.

The gas turbine engine of any preceding clause, wherein the air-to-air heat exchanger potential is between about 2.9 and 12.2 for a bypass ratio associated with the gas turbine engine between about 10 and 20 and the heat transfer surface area density being between about 1,000 $m^2/m^3$ and 10,000 $m^2/m^3$.

The gas turbine engine of any preceding clause, wherein the air-to-air heat exchanger potential is between about 2.9 and 6.7 for a bypass ratio associated with the gas turbine engine between about 10 and 20 and the heat transfer surface area density being between about 1,000 $m^2/m^3$ and 3,000 $m^2/m^3$.

The gas turbine engine of any preceding clause, wherein the air-to-air heat exchanger potential is between about 5.1 and 12.2 for a bypass ratio associated with the gas turbine engine between about 10 and 20 and the heat transfer surface area density being between about 3,000 $m^2/m^3$ and 10,000 $m^2/m^3$.

The gas turbine engine of any preceding clause, wherein the air-to-air heat exchanger potential is between about 2.9 and 11 for a bypass ratio associated with the gas turbine engine between about 13 and 20 and the heat transfer surface area density being between about 1,000 $m^2/m^3$ and 10,000 $m^2/m^3$.

The gas turbine engine of any preceding clause, wherein the air-to-air heat exchanger potential is between about 2.9 and 6.1 for a bypass ratio associated with the gas turbine engine between about 13 and 20 and the heat transfer surface area density being between about 1,000 $m^2/m^3$ and 3,000 $m^2/m^3$.

The gas turbine engine of any preceding clause, wherein the air-to-air heat exchanger potential is between about 5.1 and 11 for a bypass ratio associated with the gas turbine engine between about 13 and 20 and the heat transfer surface area density being between about 3,000 $m^2/m^3$ and 10,000 $m^2/m^3$.

An air-to-air heat exchanger in flow communication with a core air flowpath of a gas turbine engine, the air-to-air heat exchanger having an air-to-air heat exchanger potential defined by a product raised to a half power, the product being a heat transfer surface area density associated with the air-to-air heat exchanger multiplied by an airflow conductance factor that relates a fan diameter of a fan of the gas turbine engine, a bypass ratio of the gas turbine engine, and a number of compressor stages of a compressor section and a fan section of the gas turbine engine, the compressor section having one or more compressors and the fan section having a fan, and wherein the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$ and is between about 2.9 and 12.2 for a bypass ratio associated with the gas turbine engine between about 10 and 20 and the heat transfer surface area density being between about 1,000 $m^2/m^3$ and 10,000 $m^2/m^3$.

The air-to-air heat exchanger of any preceding clause, wherein the airflow conductance factor associated with the gas turbine engine is defined as a quotient determined by dividing the fan diameter of the fan by a product, the product being defined by a bypass ratio of the gas turbine engine multiplied by the number of compressor stages of the gas turbine engine.

The air-to-air heat exchanger of any preceding clause, wherein the fan diameter is between about 0.7 m and 3.5 m.

The air-to-air heat exchanger of any preceding clause, wherein the number of compressor stages is between 4 and 20.

A method, comprising: operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a heat transfer surface area density associated with the air-to-air heat exchanger multiplied by an airflow conductance factor that relates a fan diameter of the fan, a bypass ratio of the gas turbine engine, and a number of compressor stages of the gas turbine engine, and wherein the gas turbine engine is operated so that the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$ and is between about 2.9 and 12.2 for a bypass ratio associated with the gas turbine engine between about 10 and 20 and the heat transfer surface area density being between about 1,000 m²/m³ and 10,000 m²/m³.

An air-to-air heat exchanger in flow communication with a gas turbine engine, the air-to-air heat exchanger having an air-to-air heat exchanger potential defined by a product raised to a half power, the product being a heat transfer surface area density associated with the air-to-air heat exchanger multiplied by an airflow conductance factor associated with the gas turbine engine, and wherein the air-to-air heat exchanger potential is between about 6.7 and 19.5 for a bypass ratio associated with the gas turbine engine between about 3 and 10 and the heat transfer surface area density being between about 3,000 m²/m³ and 10,000 m²/m³ and is between about 2.9 and 12.2 for a bypass ratio associated with the gas turbine engine between about 10 and 20 and the heat transfer surface area density being between about 1,000 m²/m³ and 10,000 m²/m³.

A gas turbine engine, comprising: a fan section having a fan; an engine core having a compressor section that includes one or more compressors, the engine core defining a core air flowpath; an air-to-air heat exchanger in flow communication with the core air flowpath and having an air-to-air heat exchanger potential defined by a product raised to a half power, the product being a heat transfer surface area density associated with the air-to-air heat exchanger multiplied by an airflow conductance factor that relates a fan diameter of the fan, a bypass ratio of the gas turbine engine, and a number of compressor stages of the one or more compressors and the fan section, and wherein the air-to-air heat exchanger potential is between about 6.7 and 19.5 for a bypass ratio associated with the gas turbine engine between about 3 and 10 and the heat transfer surface area density being between about 3,000 m²/m³ and 10,000 m²/m³ and is between about 2.9 and 12.2 for a bypass ratio associated with the gas turbine engine between about 10 and 20 and the heat transfer surface area density being between about 1,000 m²/m³ and 10,000 m²/m³.

We claim:

1. A gas turbine engine, comprising:
   a compressor section, a combustion section, and a turbine section in a serial flow arrangement; and
   an air-to-air heat exchanger having an air-to-air heat exchanger potential defined by a product raised to a half power, the product being a heat transfer surface area density associated with the air-to-air heat exchanger multiplied by an airflow conductance factor associated with the gas turbine engine, and
   wherein the air-to-air heat exchanger potential is between about 6.7 and 19.5 for a bypass ratio associated with the gas turbine engine between about 3 and 10 and the heat transfer surface area density being between about 3,000 m²/m³ and 10,000 m²/m³ and is between about 2.9 and 12.2 for a bypass ratio associated with the gas turbine engine between about 10 and 20 and the heat transfer surface area density being between about 1,000 m²/m³ and 10,000 m²/m³.

2. The gas turbine engine of claim 1, wherein the air-to-air heat exchanger further comprises one or more exchanger units each having a core defining a plurality of channels.

3. The gas turbine engine of claim 2, wherein the heat transfer surface area density is defined as a quotient determined by dividing a heat exchanger channel surface area associated with the plurality of channels of the one or more exchanger units to a heat exchanger channel volume associated with the plurality of channels of the one or more exchanger units.

4. The gas turbine engine of claim 1, further comprising:
   a fan, and
   wherein the airflow conductance factor associated with the gas turbine engine is defined as a quotient determined by dividing a fan diameter of the fan of the gas turbine engine by a product, the product being defined by a bypass ratio of the gas turbine engine multiplied by a number of compressor stages of the gas turbine engine.

5. The gas turbine engine of claim 4, wherein the fan diameter is between about 0.7 m and 3.5 m.

6. The gas turbine engine of claim 4, wherein the fan diameter is between about 1.8 m and 3.5 m.

7. The gas turbine engine of claim 4, wherein the number of compressor stages of the gas turbine engine is between 4 and 20.

8. The gas turbine engine of claim 1, wherein the air-to-air heat exchanger potential is between about 5.1 and 19.5 for a bypass ratio associated with the gas turbine engine between about 3 and 20 and the heat transfer surface area density being between about 3,000 m²/m³ and 10,000 m²/m³.

9. The gas turbine engine of claim 1, wherein the air-to-air heat exchanger potential is between about 6.7 and 19.5 for a bypass ratio associated with the gas turbine engine between about 3 and 10 and the heat transfer surface area density being between about 3,000 m²/m³ and 10,000 m²/m³.

10. The gas turbine engine of claim 1, wherein the air-to-air heat exchanger potential is between about 2.9 and 12.2 for a bypass ratio associated with the gas turbine engine between about 10 and 20 and the heat transfer surface area density being between about 1,000 m²/m³ and 10,000 m²/m³.

11. The gas turbine engine of claim 1, wherein the air-to-air heat exchanger potential is between about 2.9 and 6.7 for a bypass ratio associated with the gas turbine engine between about 10 and 20 and the heat transfer surface area density being between about 1,000 m²/m³ and 3,000 m²/m³.

12. The gas turbine engine of claim 1, wherein the air-to-air heat exchanger potential is between about 5.1 and 12.2 for a bypass ratio associated with the gas turbine engine between about 10 and 20 and the heat transfer surface area density being between about 3,000 m²/m³ and 10,000 m²/m³.

13. The gas turbine engine of claim 1, wherein the air-to-air heat exchanger potential is between about 2.9 and 11 for a bypass ratio associated with the gas turbine engine between about 13 and 20 and the heat transfer surface area density being between about 1,000 m²/m³ and 10,000 m²/m³.

14. The gas turbine engine of claim 1, wherein the air-to-air heat exchanger potential is between about 2.9 and 6.1 for a bypass ratio associated with the gas turbine engine between about 13 and 20 and the heat transfer surface area density being between about 1,000 m²/m³ and 3,000 m²/m³.

15. The gas turbine engine of claim 1, wherein the air-to-air heat exchanger potential is between about 5.1 and 11 for a bypass ratio associated with the gas turbine engine between about 13 and 20 and the heat transfer surface area density being between about 3,000 m²/m³ and 10,000 m²/m³.

16. An air-to-air heat exchanger in flow communication with a core air flowpath of a gas turbine engine, the air-to-air heat exchanger having an air-to-air heat exchanger potential defined by a product raised to a half power, the product being a heat transfer surface area density associated with the air-to-air heat exchanger multiplied by an airflow conductance factor that relates a fan diameter of a fan of the gas turbine engine, a bypass ratio of the gas turbine engine, and a number of compressor stages of a compressor section and a fan section of the gas turbine engine, the compressor section having one or more compressors and the fan section having a fan, and wherein the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$ and is between about 2.9 and 12.2 for a bypass ratio associated with the gas turbine engine between about 10 and 20 and the heat transfer surface area density being between about 1,000 $m^2/m^3$ and 10,000 $m^2/m^3$.

17. The air-to-air heat exchanger of claim 16, wherein the airflow conductance factor associated with the gas turbine engine is defined as a quotient determined by dividing the fan diameter of the fan by a product, the product being defined by a bypass ratio of the gas turbine engine multiplied by the number of compressor stages of the gas turbine engine.

18. The air-to-air heat exchanger of claim 16, wherein the fan diameter is between about 0.7 m and 3.5 m.

19. The air-to-air heat exchanger of claim 16, wherein the number of compressor stages is between 4 and 20.

20. A method, comprising:

operating a gas turbine engine having a fan and an engine core positioned downstream of the fan, the engine core having a compressor section that includes one or more compressors, the engine core defining a core air flowpath, the gas turbine engine having an air-to-air heat exchanger in flow communication with the core air flowpath and having an air-to-air heat exchanger potential defined by a product raised to a half power, the product being a heat transfer surface area density associated with the air-to-air heat exchanger multiplied by an airflow conductance factor that relates a fan diameter of the fan, a bypass ratio of the gas turbine engine, and a number of compressor stages of the gas turbine engine, and wherein the gas turbine engine is operated so that the air-to-air heat exchanger potential is between about 6.7 and 19.5 for a bypass ratio associated with the gas turbine engine between about 3 and 10 and the heat transfer surface area density being between about 3,000 $m^2/m^3$ and 10,000 $m^2/m^3$ and is between about 2.9 and 12.2 for a bypass ratio associated with the gas turbine engine between about 10 and 20 and the heat transfer surface area density being between about 1,000 $m^2/m^3$ and 10,000 $m^2/m^3$.

\* \* \* \* \*